UNITED STATES PATENT OFFICE.

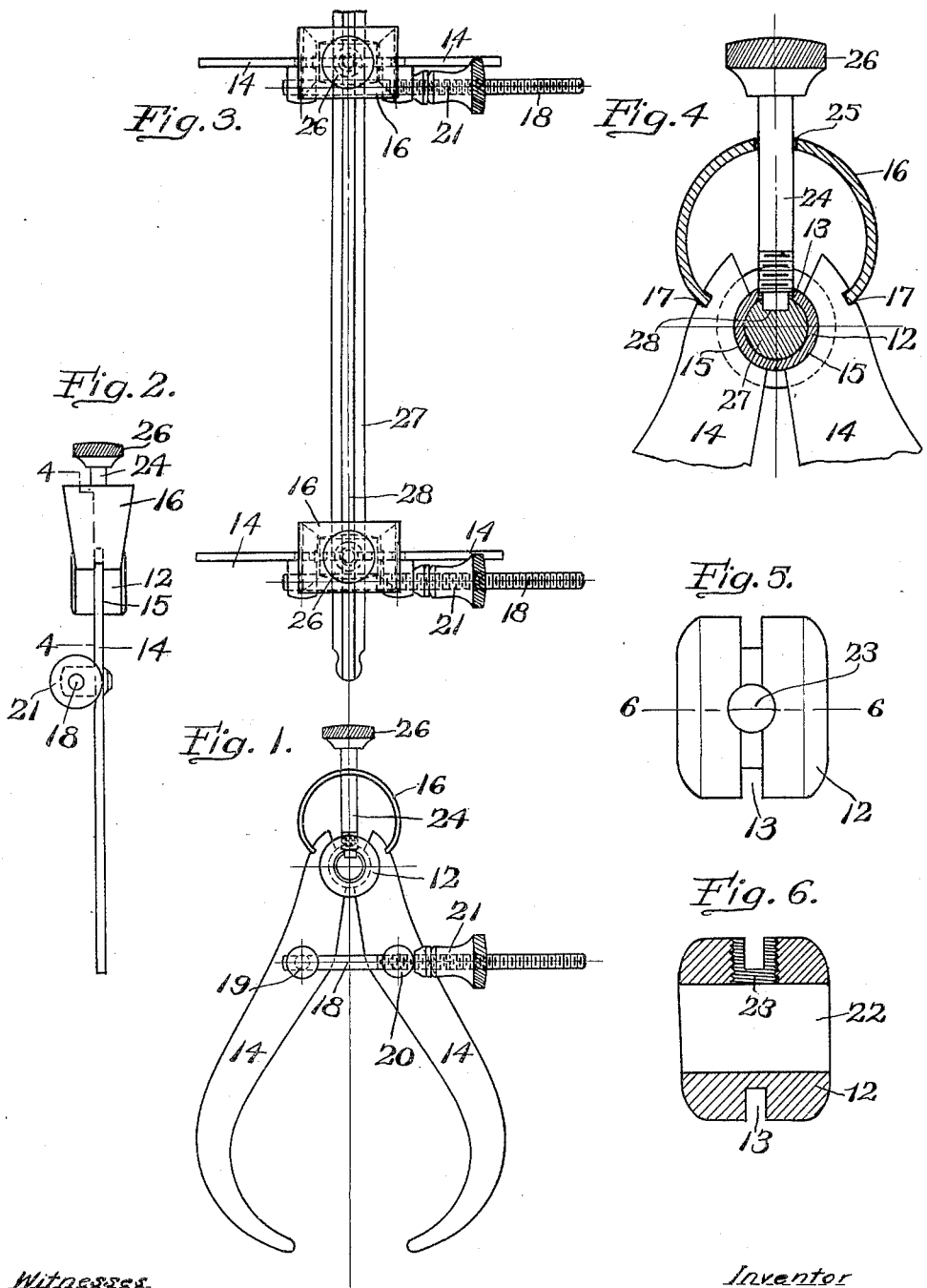

JOHN G. JERNBERG, OF BOSTON, MASSACHUSETTS.

CALIPERS.

1,099,652.  Specification of Letters Patent.  Patented June 9, 1914.

Application filed May 19, 1913. Serial No. 768,446.

*To all whom it may concern:*

Be it known that I, JOHN G. JERNBERG, a citizen of the United States, and a resident of Boston, in the county of Suffolk and State of Massachusetts, have invented certain new and useful Improvements in Calipers, of which the following is a specification.

This invention has for its object to provide a caliper adapted to be used in the ordinary manner and also adapted to be coupled to and spaced from another caliper of like construction, the two calipers adapted to be used conjointly for calipering tapered bodies, the legs of each caliper being adjustable independently.

The invention consists in the improvements which I will now proceed to describe and claim.

Of the accompanying drawings: Figure 1 represents a side elevation of a caliper embodying my invention. Fig. 2 represents an edge view of the same. Fig. 3 represents a plan view showing two calipers coupled together by a coupling rod. Fig. 4 represents an enlarged section on line 4—4 of Fig. 2, the coupling rod being in place. Fig. 5 represents an edge view of the part hereinafter termed the caliper hub. Fig. 6 represents a section on line 6—6 of Fig. 5.

The same reference characters indicate the same parts in all the figures.

In the drawings, 12 represents a hub having a peripheral groove 13 which receives the inner end portions of the caliper legs 14, said portions being provided with curved recesses 15, Fig. 4, fitting the bottom of the groove 13 and adapted to slide thereon.

16 represents a bow spring, the ends of which are engaged with notches 17 formed in the outer edges of the inner end portions of the legs 14. The ends of the spring exert a constant inward pressure on the inner end portions of the caliper legs and tend to force the outer end portions of the legs apart to an extent determined by suitable adjusting means such as a screw threaded rod 18 secured to a post 19 on one of the legs 14 and passing loosely through a guide 20 on the other leg and an adjusting nut 21 engaged with the screw-threaded portion of the rod 18 and bearing on the outer side of the guide 20. When the nut 21 is turned inwardly it causes the caliper legs to approach each other, and when it is turned outwardly it permits the spring 16 to force the caliper legs apart.

The construction thus far described is well known and is not claimed by me.

In carrying out my invention, I form in the hub 12 a central socket 22, Fig. 6, extending from side to side of the hub, and an internally threaded orifice 23 extending from the periphery of the hub to the socket 22. I also provide the hub with a set screw 24 engaging the threaded orifice 23 and adapted to enter the socket 22, the shank of said set screw being preferably extended through an orifice 25 in the center of the spring 16, and provided with a head 26.

My invention is further embodied in the coupling rod 27 adapted to enter the socket 22 and to be engaged by the set screw 24 which when turned inwardly, secures the socket to the coupling rod. The rod is preferably provided with a recess here shown as a longitudinal groove 28 adapted to receive the reduced inner end of the set screw 24 and prevent the hub from turning on the coupling rod. Owing to the fact that the reduced inner ends of the set-screws 24 enter the longitudinal groove 28 in the coupling-rod, the two calipers are always in alinement, so that they will properly coöperate when measuring a piece of work extending from one caliper to the other. In other words, neither caliper can change its rotative position relatively to the coupling-rod, when it is being adjusted longitudinally of the latter, and therefore, the spaces between the legs of the two calipers will always be in alinement suitable for the measuring operation described.

It will now be seen that two calipers constructed as above described may be secured to the coupling rod 27 and spaced apart thereby, the legs of the two calipers projecting from one side of the rod and being independently adjustable so that the calipers and the coupling rod form a gang-caliper adapted to measure tapered pieces of work. Each caliper when removed from the rod is adapted to be used in the ordinary manner as a single caliper.

I claim:—

1. A caliper comprising a hub, legs adapted to swing on the hub, a spring confining the legs in movable engagement with the hub and adapted to force the legs apart, and means for adjusting the legs, the hub being provided with a socket adapted to receive a coupling rod, and with a set screw adapted to secure the hub to said rod.

2. A caliper comprising a hub, legs adapted to swing on the hub, a spring having an orifice and confining the legs in movable engagement with the hub and adapted to force the legs apart, and means for adjusting the legs, the hub being provided with a socket adapted to receive a coupling rod, and with a set screw adapted to secure the hub to said rod, the shank of the set screw being extended through said orifice in the spring.

3. In combination, a plurality of calipers, each comprising a hub, legs adapted to swing on the hub, a spring confining the legs in movable engagement with the hub and adapted to force the legs apart, and means for adjusting the legs, the hub being provided with a socket and with a set screw adapted to enter said socket, and a coupling rod adapted to enter the sockets of the caliper hubs and having a recess formed to receive the said set screws and prevent rotation of the hubs on the rod.

In testimony whereof I have affixed my signature, in presence of two witnesses.

JOHN G. JERNBERG.

Witnesses:
  C. T. BROWN,
  J. MURPHY.

---

Copies of this patent may be obtained for five cents each, by addressing the "Commissioner of Patents, Washington, D. C."